United States Patent
Maekawa et al.

(10) Patent No.: US 9,928,932 B2
(45) Date of Patent: Mar. 27, 2018

(54) METAL MICROPARTICLES PROVIDED WITH PROJECTIONS

(71) Applicant: M. TECHNIQUE CO., LTD., Izumi-shi, Osaka (JP)

(72) Inventors: Masaki Maekawa, Izumi (JP); Masakazu Enomura, Izumi (JP)

(73) Assignee: M. TECHNIQUE CO., LTD., Izumi-Shi, Osaka (JP)

( * ) Notice: Subject to any disclaimer, the term of this patent is extended or adjusted under 35 U.S.C. 154(b) by 320 days.

(21) Appl. No.: 14/441,483

(22) PCT Filed: Nov. 8, 2012

(86) PCT No.: PCT/JP2012/079031
§ 371 (c)(1),
(2) Date: May 7, 2015

(87) PCT Pub. No.: WO2014/073082
PCT Pub. Date: May 15, 2014

(65) Prior Publication Data
US 2015/0310955 A1    Oct. 29, 2015

(51) Int. Cl.
*B22F 9/24* (2006.01)
*H01B 1/02* (2006.01)
*B22F 1/00* (2006.01)
*B22F 9/00* (2006.01)
(Continued)

(52) U.S. Cl.
CPC .............. *H01B 1/02* (2013.01); *B01J 23/755* (2013.01); *B01J 35/026* (2013.01); *B22F 1/00* (2013.01); *B22F 1/0007* (2013.01); *B22F 1/0048* (2013.01); *B22F 9/00* (2013.01); *B22F 9/24* (2013.01)

(58) Field of Classification Search
CPC ......... H01B 1/02; B01J 23/755; B01J 35/026; B22F 9/00; B22F 1/00; B22F 1/0048; B22F 1/0007; B22F 9/24
See application file for complete search history.

(56) References Cited

U.S. PATENT DOCUMENTS

| 8,747,699 B2 | 6/2014 | Enomura |
| 2003/0201427 A1* | 10/2003 | Hori ............... B22F 1/0003 252/500 |
| 2007/0138446 A1 | 6/2007 | Furukawa |

(Continued)

FOREIGN PATENT DOCUMENTS

| CN | 1475017 A | 2/2004 |
| CN | 101790430 A | 7/2010 |

(Continued)

*Primary Examiner* — Anthony J Zimmer
(74) *Attorney, Agent, or Firm* — Birch, Stewart, Kolasch & Birch, LLP

(57) ABSTRACT

In response to the demand for shape-controlled metal microparticles accompanying rapid development and progress in industry in recent years, metal microparticles, which have projections on the surfaces of the particles that are integrated with the particles, are provided. The metal microparticles have integrated conical projections on the surfaces of the particles, and at least some of the projections are more than ¼ of the size of the particles. The protrusions that protrude from the metal microparticles melt and deform at a temperature lower than the melting point of the metal itself.

14 Claims, 23 Drawing Sheets

(51) Int. Cl.
*B01J 23/755* (2006.01)
*B01J 35/02* (2006.01)

(56) References Cited

U.S. PATENT DOCUMENTS

2010/0327236 A1 12/2010 Enomura
2013/0333520 A1 12/2013 Enomura

FOREIGN PATENT DOCUMENTS

| | | |
|---|---|---|
| EP | 1355324 A1 | 10/2003 |
| EP | 2177294 A1 | 4/2010 |
| JP | 2000-243132 A | 9/2000 |
| JP | 2002-146401 A | 5/2002 |
| JP | 2002-298654 A | 10/2002 |
| JP | 2004-149903 A | 5/2004 |
| JP | 2005-133119 A | 5/2005 |
| JP | 2007-191786 A | 8/2007 |
| JP | 2011-100605 A | 5/2011 |
| JP | 2012-134156 A | 7/2012 |
| WO | WO 2012/124046 A1 | 9/2012 |

* cited by examiner (A)

(B)

(A)

(B)

(B)

METAL MICROPARTICLES PROVIDED WITH PROJECTIONS

TECHNICAL FIELD

The present invention relates to metal microparticle including a nickel element contained therein and being provided with a projection having a shape apparently tapering-off to a point, such as a conical projection.

BACKGROUND ART

Nickel microparticle is used in such applications as an electrically conductive material and a catalyst; and it is the material drawing a keen attention in recent years. Metal microparticle such as nickel microparticle is different in its required characteristics depending on the filed in which it is used; and thus, it is considered to be necessary to control the shape of the particle in addition to control of particle diameter and crystallite diameter thereof. For example, in the electrically conductive microparticle used for electrical connection of a circuit substrate etc., in order to increase the contacting sites in the matrix as well as to enhance the electric conductivity performance, particles having projections on surface thereof are considered to be necessary. In other examples, in the case that the particle is used as a catalyst, if the particle has a larger specific surface area with the same particle diameter, better characteristics thereof can be obtained; and therefore, metal microparticles having a projection on the surface thereof is considered to be necessary.

Microparticle having an electrically conductive layer of nickel or a nickel alloy, the said electrically conductive layer having a projection form and being formed on surface of the substrate particle comprising resin microparticles, such as those described in Patent Document 1 and Patent Document 2, has been disclosed. However, in this example, fine nickel microparticles or agglomerates thereof are merely attached on the particle surface in a way of a dot-like or a string-like form. If this microparticle is laminated with the same material or composed of a different material, there are problems of delamination and of characteristic change because physical properties such as thermal expansion are different therebetween. The nickel microparticle such as the one described in Patent Document 3, which has particle diameter of 0.1 to 10 μm and on outer surface thereof a number of projections whose heights are less than ¼ relative to the particle diameter, has been disclosed; however, in this microparticle, it is difficult to keep sufficient contact because of the small projections; and therefore, it has been difficult to realize to prevent the poor conductivity, to lower the resistance value, etc.

Moreover, in any of these Documents, the study on the ratio (d/D) of a crystallite diameter (d) to a particle diameter (D) has not been carried out extensively.

Besides, in order to increase the utility as an electrically conductive slurry, it is considered to be beneficial if fusion of the particles among themselves takes place in a relatively low temperature region with the value thereof being ⅕ or less relative to the own melting point of the metal. However, actually, the investigation with regard to this point has not been carried out extensively.

In manufacturing of microparticles such as metal microparticles, it is often necessary to prevent agglomeration of the obtained microparticles among themselves; however, in the existing technologies, the agglomeration is generally prevented by use of a dispersant etc., and therefore, the status quo thereof is that this prevention of agglomeration does not come from the idea by the shape of microparticles.

DISCLOSURE OF INVENTION

Problems to be Solved by the Invention

PRIOR ART DOCUMENTS

Patent Document

Patent Document 1: Japanese patent Laid-Open Publication No. 2012-134156
Patent Document 2: Japanese patent Laid-Open Publication No. 2000-243132
Patent Document 3: Japanese patent Laid-Open Publication No. 2007-191786

The problems to be solved by the present invention are to provide: a novel metal microparticle, wherein effects by the projection sticking out from the particle main body can be sufficiently expressed for enhancement of the electric conductivity characteristics and the catalytic properties, for fusion of the particles among themselves in a relatively low temperature region such as for example at about 200° C. or lower, for prevention of agglomeration of the particles among themselves, and so on: and in addition, metal microparticle powders as well as a slurry, the powders and the slurry containing the said metal microparticle, Means for Solving the Problems In metal microparticle comprising a particle main body and a projection sticking out from the particle main body with particle diameter of the particle main body being 5 μm or less, inventors of the present invention could produce metal microparticle including a nickel element contained therein and having a novel shape with a sufficiently long projection; and based on this achievement, the present invention could be completed.

Meanwhile, in the description of this specification, "particle diameter" means the particle diameter of the particle main body without the projections unless otherwise noted.

The metal microparticle of the present invention is characterized in that the projection has a shape of tapering-off to a point, the shape that an apparent width thereof becomes gradually narrower with going from a base end to a front end thereof, and at the same time, among the projections, a height of at least one projection is in the range of more than ¼ to 8/4 or less relative to the particle diameter of the particle main body. In addition, the metal microparticle of the present invention is characterized in that in the metal microparticle comprising the particle main body and the projection sticking out from the particle main body with particle diameter of the particle main body being 5 μm or less, the projection is deformed by melting at a temperature lower than the own melting point of the metal which constitutes the projection.

Furthermore, the present invention provides a metal particle-containing composition, wherein the composition contains the metal microparticle and is in the form of powders or a slurry.

The above-mentioned projection has a shape of tapering-off to a point, the shape that an apparent width thereof observed by an electron microscope becomes gradually narrower with going from a base end to a front end thereof; and it is preferable that the apparent width of the base end be equal to or less than twice the value of the apparent height. More preferably the apparent width of the base end is equal to or less than the apparent height; or still more preferably the apparent width of the base end is ½ or lower relative to the apparent height. As explained above, when the projection becomes finer and longer, deformation thereof by melting can be facilitated, so that deformation by melting takes place at the temperature lower than the own melting point of the metal which constitutes the projection, for example even at the temperature of ⅕ or lower relative to the melting point of the same, and in addition, the effect to prevent agglomeration of the particles among themselves can be enhanced. The metal microparticle of the present invention is the microparticle of nickel, a nickel alloy, a nickel compound, or the like, wherein the particle main body and the projection are formed integrally by using the same material, so that this microparticle is very useful as an electrically conductive material and as a catalyst. In addition, because the particle main body and the projection are formed integrally by using the same material, possibilities of delamination and change of properties can be reduced, so that stable characteristics can be expressed. Meanwhile, the embodiment in which the ratio (d/D) of the crystallite diameter (d) to the particle diameter (D) of the metal microparticle is 0.02 or more is advantageously executed. When this ratio (d/D) becomes larger, possibility of reduce thermal shrinkage, deterioration, and the like becomes higher.

The metal microparticle of the present invention is characterized in that the length of the projection thereof is sufficiently longer as compared with heretofore known particles. The shape of the particle main body is not particularly restricted. The shape of the particle main body is not restricted to a spherical shape, so that even an indefinite shape thereof can express the effects of the present invention. In addition, it is preferable that the specific area of the metal microparticle be 2.5 times or more relative to the specific surface area calculated from the particle diameter of the particle main body with the assumption that the metal microparticle is spherical.

Advantages

The present invention can provide a novel metal microparticle which can sufficiently express the effects of projection sticking out from the particle main body, the effects such as enhancements of the electric conductivity characteristics and the catalytic properties.

This metal microparticle can be executed as embodiments so as to have various characteristics; for example, the metal microparticle with the ratio (d/D) of the crystallite diameter (d) to the particle diameter (D) in the metal microparticle being 0.02 or more could be provided, so that there are possibilities to reduce thermal shrinkage and deterioration; and thus, enhancements of the electric conductivity characteristics and the catalytic properties can be expected. In addition, because larger surface area thereof can be secured as compared with the particle not having a projection or heretofore known particles having a projection, there is a possibility that an equal or even a higher effect can be obtained with a fewer quantity thereof than before, so that saving of resources may be expected. In addition, because the projection sticking out from the particle main body deforms by melting at the temperature lower than the own melting point of the metal which constitutes the projection, particles can be fused among themselves by the heat treatment at the temperature lower than before, so that an electrically conductive microparticle and a wiring member using the same may be obtained with a lower energy. Furthermore, because of the presence of a sufficiently long projection, agglomeration of the metal microparticles among themselves can be suppressed.

BEST MODES FOR CARRYING OUT THE INVENTION

Figure 1:
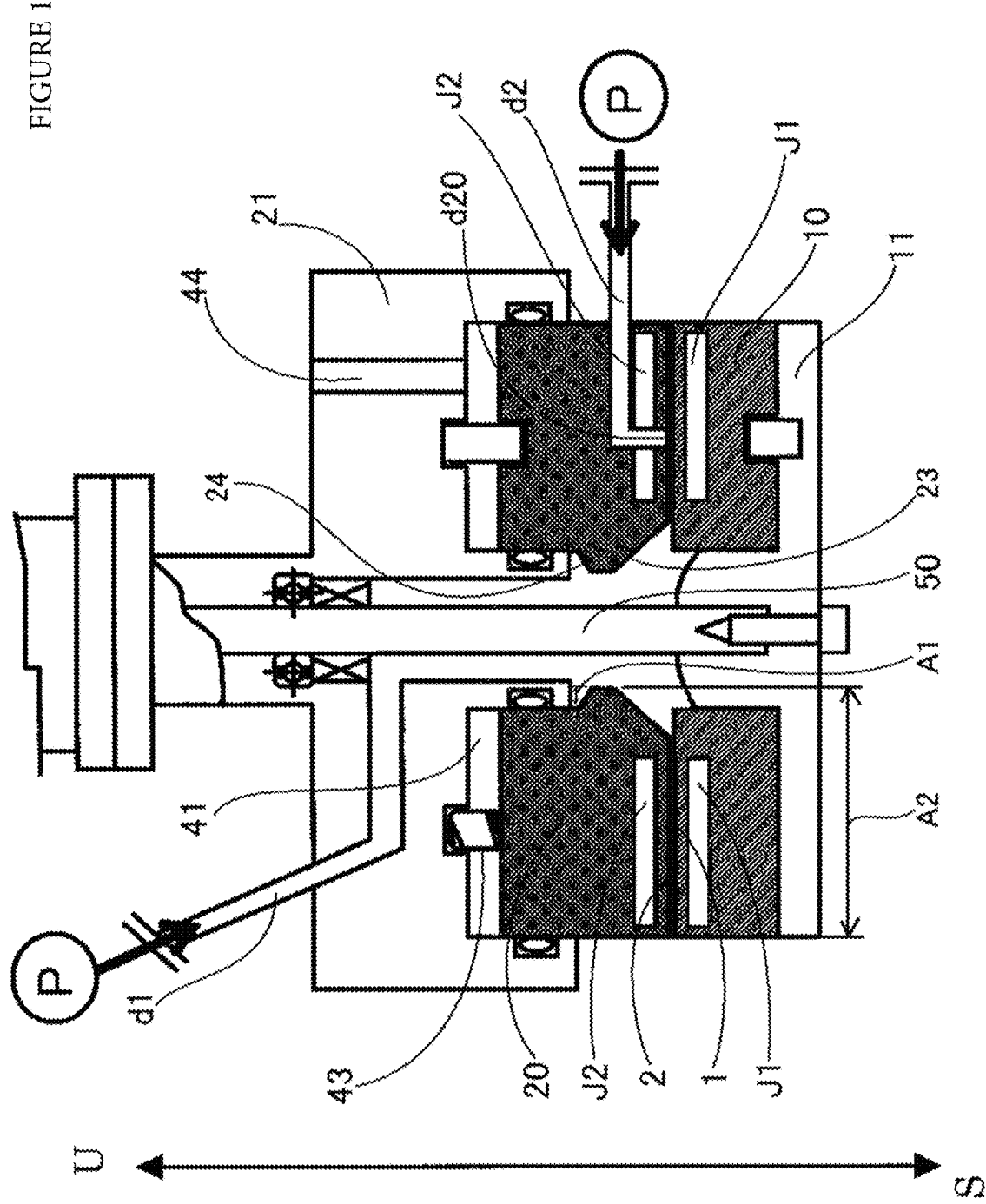
FIG. 1: this shows a rough cross section view of the fluid processing apparatus according to the embodiment of the present invention.

The metal microparticle of the present invention is the metal microparticle having a projection. It is preferable that this projection be integrated with the main body thereof; and the embodiment thereof may be singular or plural. As can be seen in FIG. 23(A), the height (H) of at least one projection is preferably more than $1/4$ relative to the particle diameter (D) of the particle main body. The projection is preferably in a conical shape such as a polygonal cone and a circular cone. Shape of the projection may be all in the same or different. In addition, the metal microparticle of the present invention is the fine microparticle having the size of 5 µm or less, or preferably 1 µm or less.

More specifically, the particle diameter (D) thereof is preferably in the range of 10 to 1000 nm, more preferably in the range of 20 to 1000 nm, or still more preferably in the range of 50 to 1000 nm. If the particle diameter (D) is less than 10 nm, the possibility may be presumed that depression of the melting point of the entire particle due to nanoization of the particle has some effect, so that the special meaning of forming the projection may be lost.

In the particle main body having various particle diameters, inventors of the present invention could produce the particle having projections with various sizes; and with regard to the longest projection, the projection having the height (H) in the range of 10 to 630 nm was confirmed, while with regard to the ratio to the particle diameter (D), the height (H) of the projection in the range of about $1/4$ to $8/4$ relative to the particle diameter (D) could be confirmed. Especially, the projection in the range of $2/4$ to $5/4$ could be produced stably.

On the other hand, with regard to the short projection, the projection having the height (H) in the range of 1 to 250 nm was confirmed; and with regard to the ratio to the particle diameter (D), the height (H) of the projection in the range of about less than $1/4$ to less than $1/100$ relative to the particle diameter (D) could be confirmed.

However, these values are obtained based on the observation result with an electron microscope, wherein the observation shows inevitably a planar view even for the particle main body as well as the projection in the steric structure; and therefore, it is considered that the value of the actual projection may be somewhat larger than these values.

The width (W) of the base end of each projection was in the range of 1 to 500 nm, although it was different depending on the particle diameter (D), wherein the width (W) of the base end being in the range of about 2/1 to $1/10$ relative to the height (H) of the projection could be confirmed.

Number of the total projections in a single particle is in the range or 2 to 1000, or preferably in the range of 10 to 500; and 2 to 100 projections could be confirmed in the particle produced in a proper way.

All the projections in the particle are preferably the large projections having the apparent height (H) by the electron microscope as mentioned above with the value more than $1/4$ relative to the particle diameter (D) of the particle main body; however, the present invention is not restricted to this value, so that a mixture thereof with the small projections having the height (H) with the value $1/4$ or less relative to the particle diameter (D) may be allowed. The number of these large projections are the most preferably 30% or more relative to the entire number of the projections; however, in such a case that there are many projections, the large projections may be 10% or more, or it may be allowed even if at least one projection is the large projection and all the rest are small projections.

As shown in FIG. 23(B), in the case that the particle diameter (D1) is 5.0 µm or less and the projections are located in a position they are faced with each other, the apparent plain distance (D8) between the projections by the electron microscope is 7.5 µm or less. The height (H8) of the longest projection among these projections is preferably more than $1/5$ relative to the plain distance (D8). Meanwhile, in the actual particle, the large projections are not necessarily located in a position they are faced with each other; and therefore, the longest apparent plain distance between the projections among plural projections by the electron microscope may be 7.5 µm or less.

In the above-mentioned particle, the sticking-out projection deforms by melting at the temperature lower than the own melting point of the metal. For example, in the case of nickel described in the examples shown below, the melting point thereof is generally 1450° C. ("Physics and Chemistry Dictionary", $4^{th}$ edition, ed. by Ryogo Kubo, et al., Iwanami Shoten Publishers); however, the deformation by melting to cause fusion of the particles among themselves takes place at low temperature of 150° C., the temperature of $1/5$ or less relative to the said melting point. Therefore, it became possible to fuse and combine the particles among themselves at the temperature further lower than before.

More specifically, the metal microparticle of the present invention has the projection sticking out from surface of the particle main body with a shape of tapering-off to a point. This projection is sufficiently long and becomes finer as it goes to the front end whereby it becomes a nanometer scale, so that a so-called the quantum size effect can be expressed readily. Because of this, the projection part shows the special behavior which cannot take place in the clumps of a substance, that is, in the so-called bulk substance; and as a result of this, it is presumed that the sticking-out projection can deform by melting at the temperature of $1/5$ or less relative to the own melting point of this substance.

In addition, the ratio (d/D) of the crystallite diameter (d) to the particle diameter (D) of the metal microparticle is preferably 0.02 or more. The particle diameter of the metal microparticle is not particularly restricted; however, the diameter of the microparticle is 5 µm or less, or preferably 1 µm or less. When this ratio (d/D) becomes larger, possibility of reducing the thermal shrinkage, deterioration, etc. becomes higher.

The metal in the present invention includes a nickel element; and besides nickel as a pure metal, this may be an alloy of nickel with one or plural elements other than nickel selected from silver, copper, tin, and the like; or this may be a metal compound containing nickel and other metal elements or non-metal elements.

Method for producing the metal microparticle in the present invention is not particularly restricted. For example, this can be produced by using an apparatus such as the one disclosed in International Patent Laid-Open Publication No. 2009/008393 disclosed by the applicant of the present invention; and this apparatus is advantageous in order to produce fine and uniform particles having the size of 5 μm or less, or preferably 1 μm or less.

Figure 2:
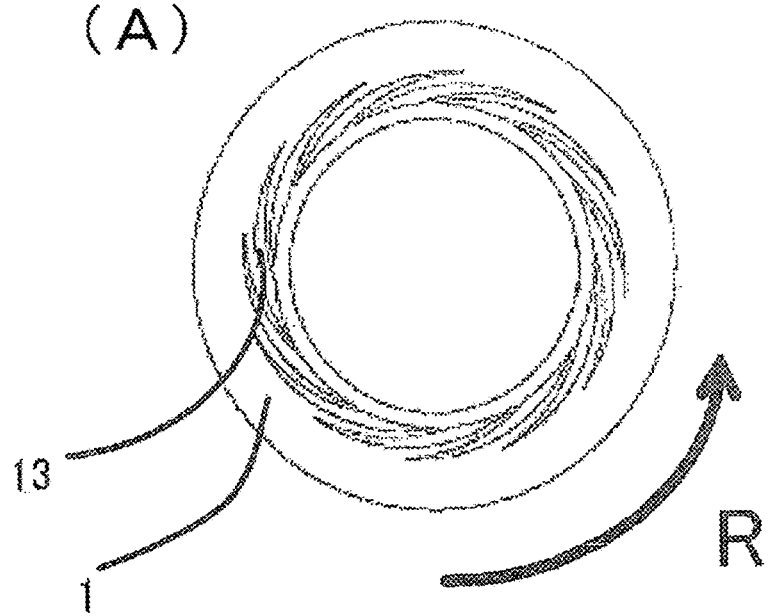
FIG. 2: (A) shows a rough plain view of the first processing surface of the fluid processing apparatus shown in FIG. 1; and (B) shows an enlarged view of the main part of the processing surface of the said apparatus.
Figure 2:
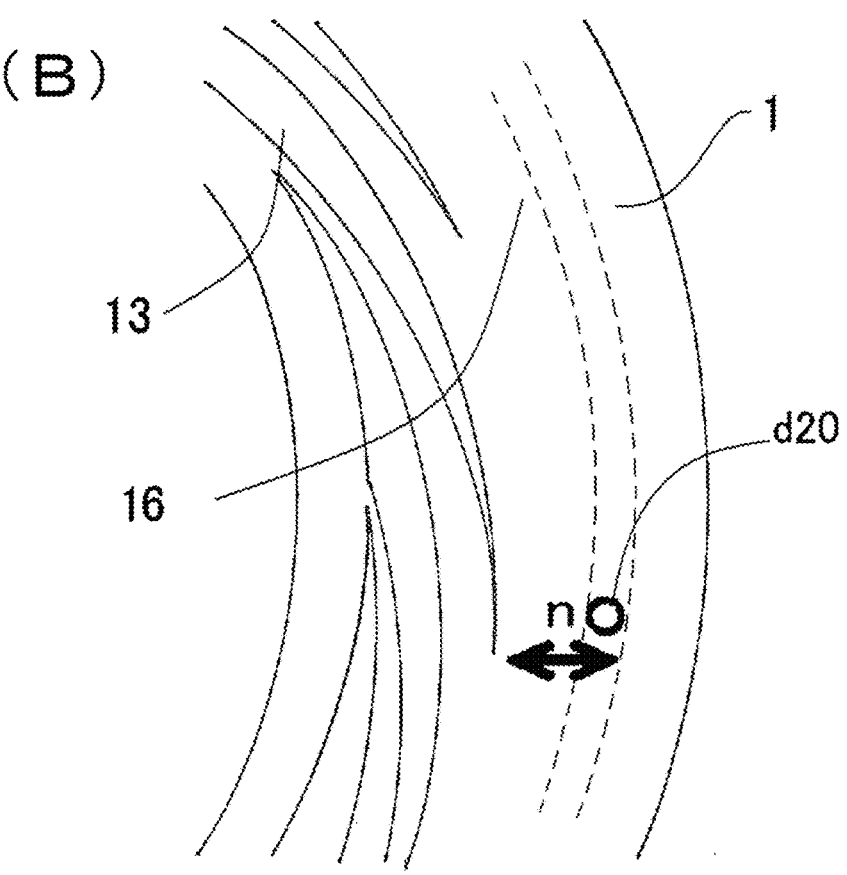
Figure 3:
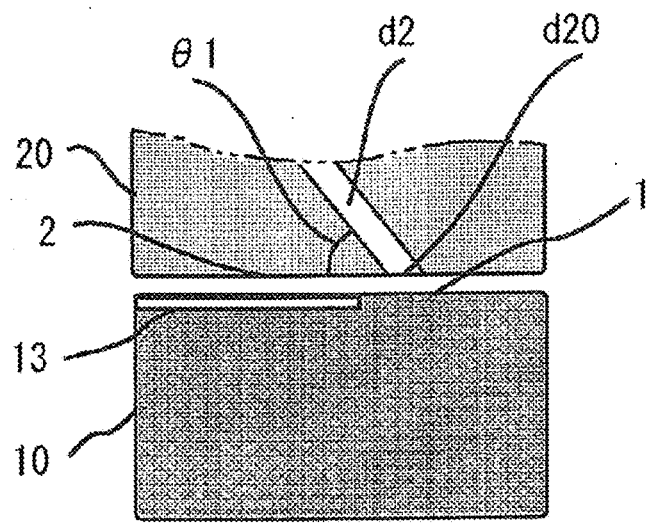
FIG. 3: (A) shows a cross section view of the second introduction part of the said apparatus; and (B) shows an enlarged view of the main part of the processing surface to explain the second introduction part of the same.
Figure 3:
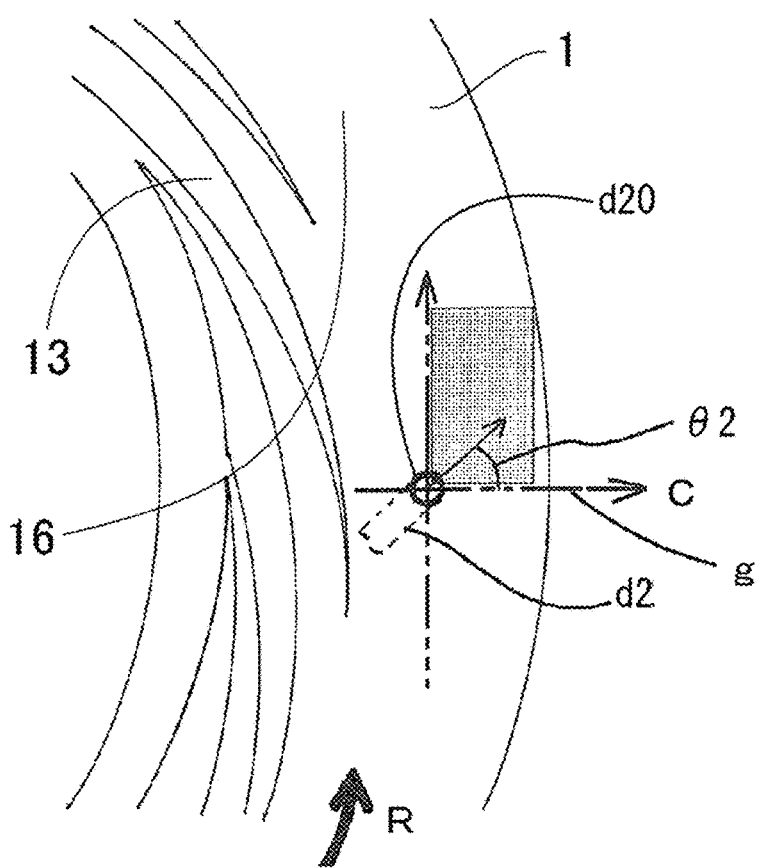
Figure 4:
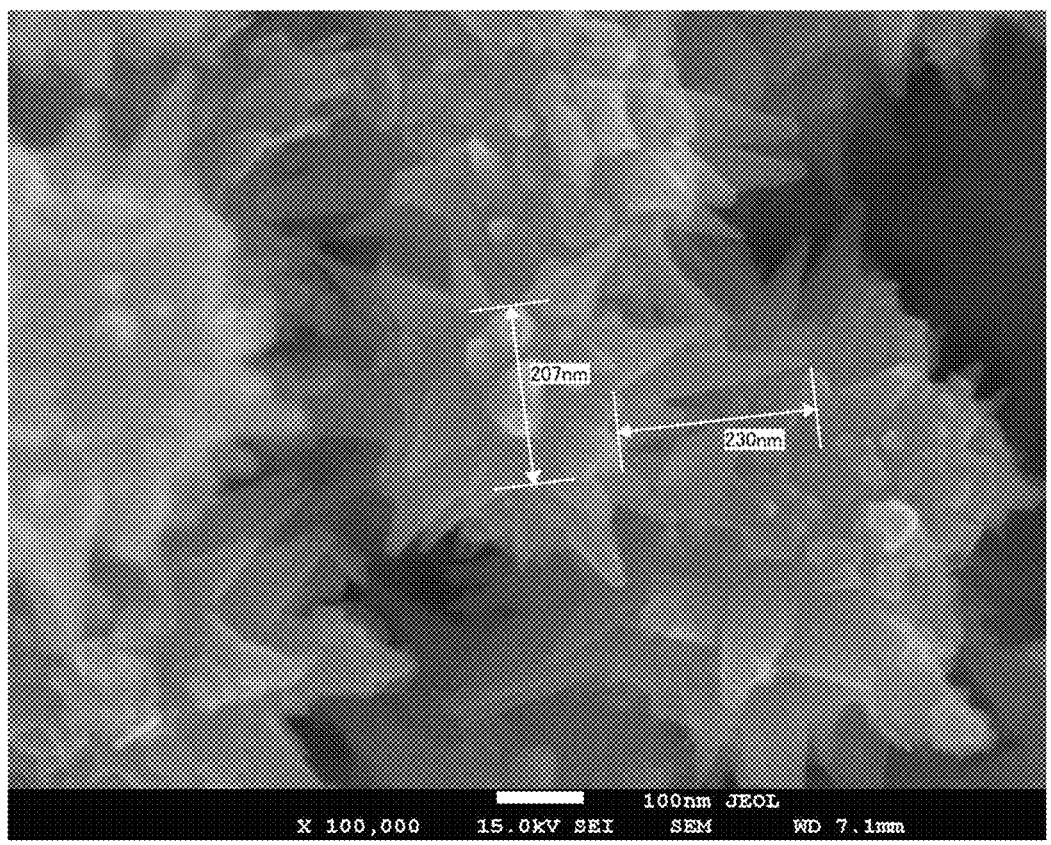
FIG. 4: This shows the SEM picture of the nickel microparticle obtained in Production Example 1 with the magnification of 100,000.
Figure 5:
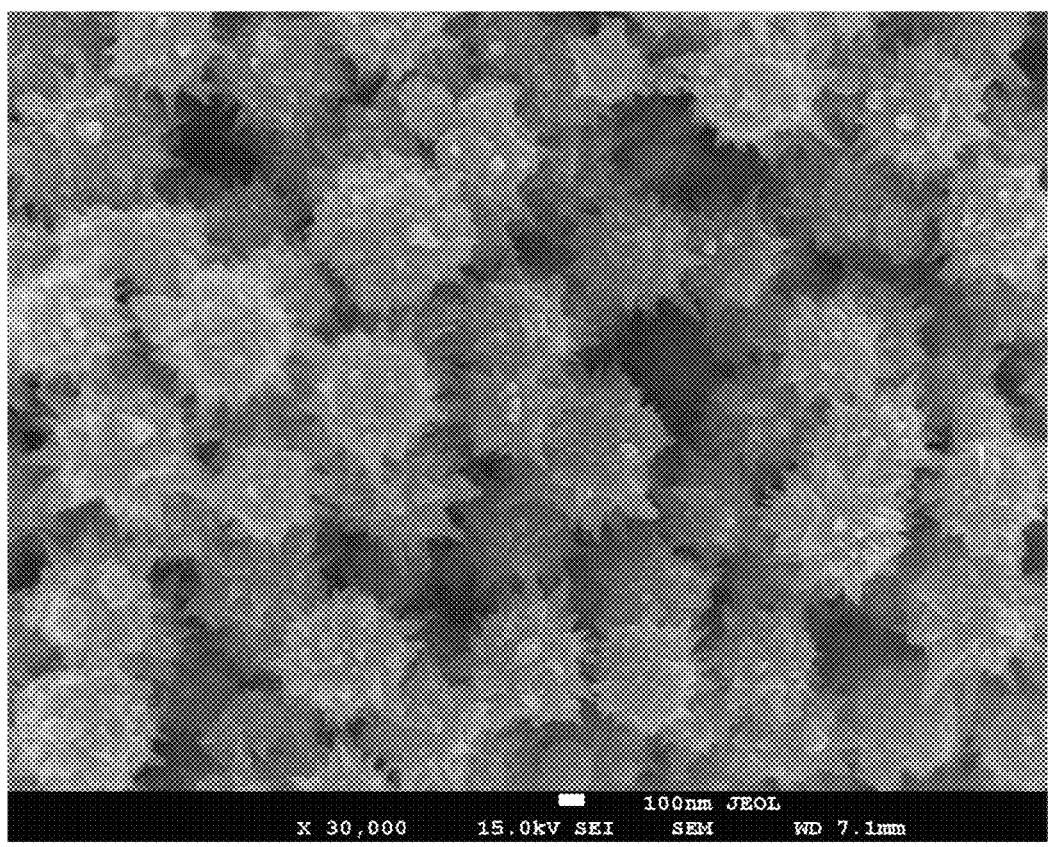
FIG. 5: This shows the SEM picture of the nickel microparticle obtained in Production Example 1 with the magnification of 30,000.
Figure 6:
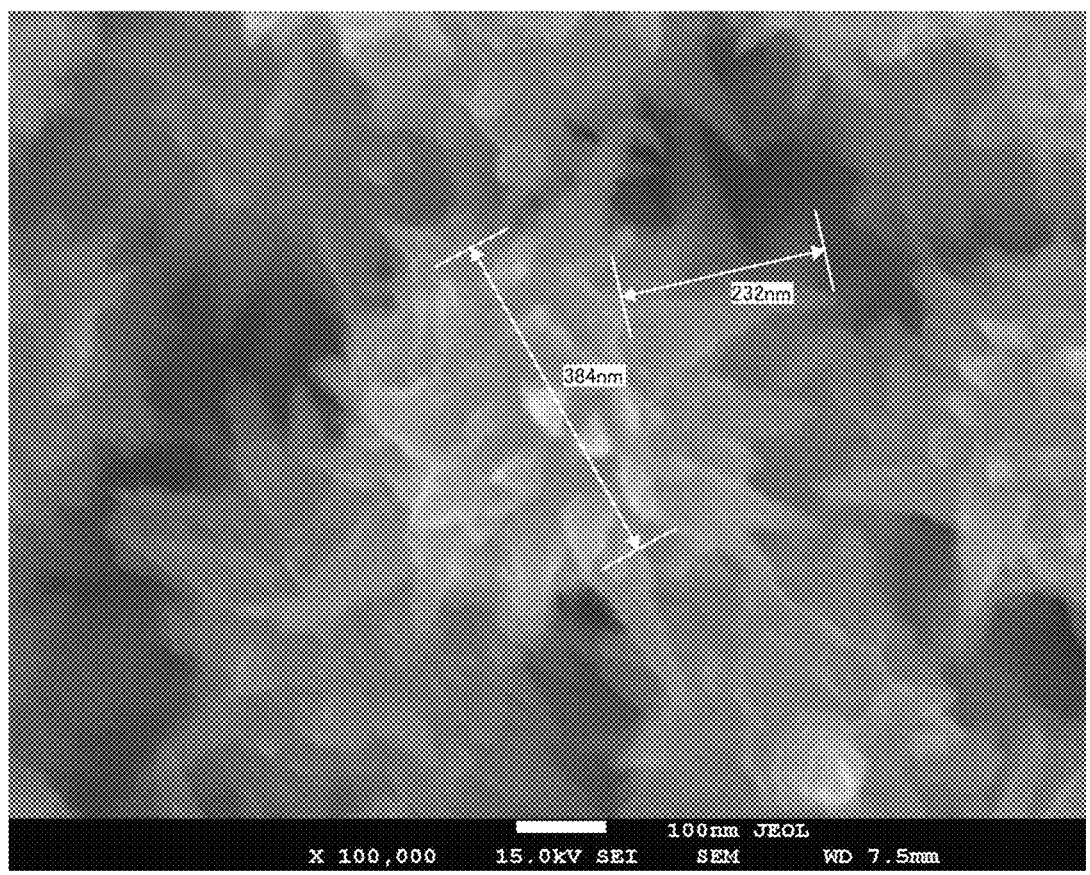
FIG. 6: This shows the SEM picture of the nickel microparticle obtained in Production Example 2 with the magnification of 100,000.
Figure 7:
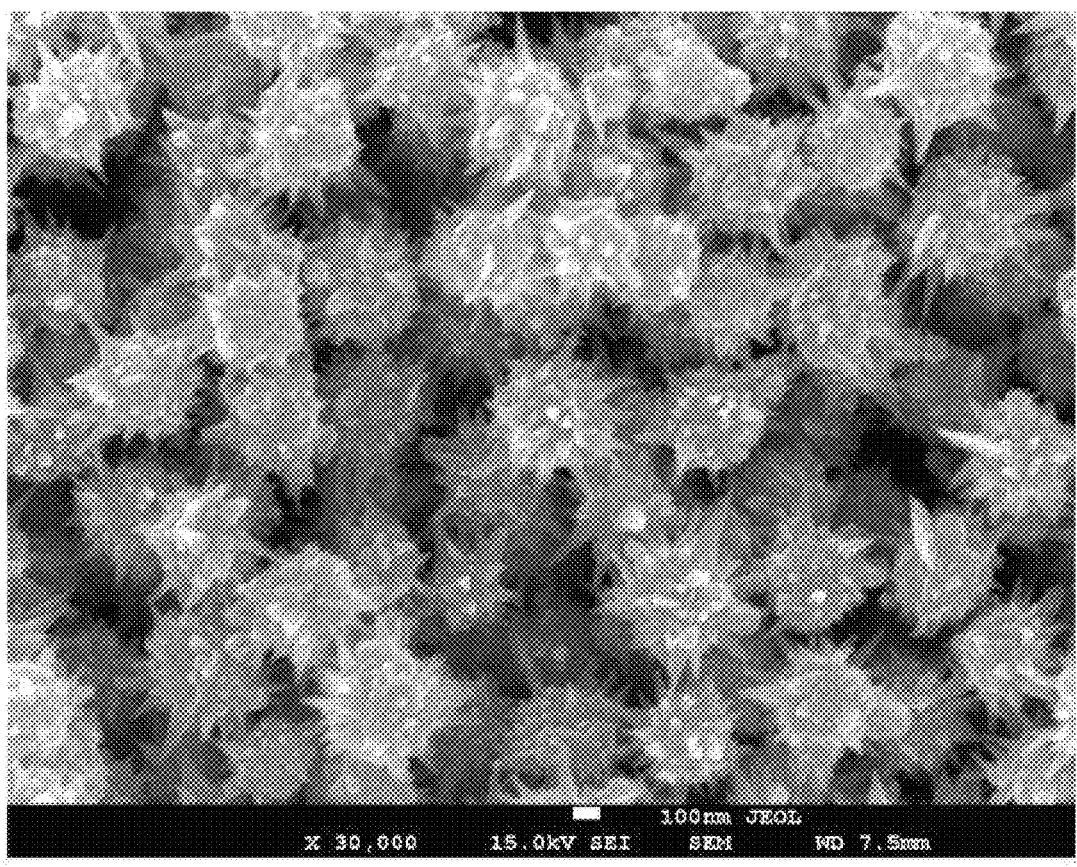
FIG. 7: This shows the SEM picture of the nickel microparticles obtained in Production Example 2 with the magnification of 30,000.
Figure 8:
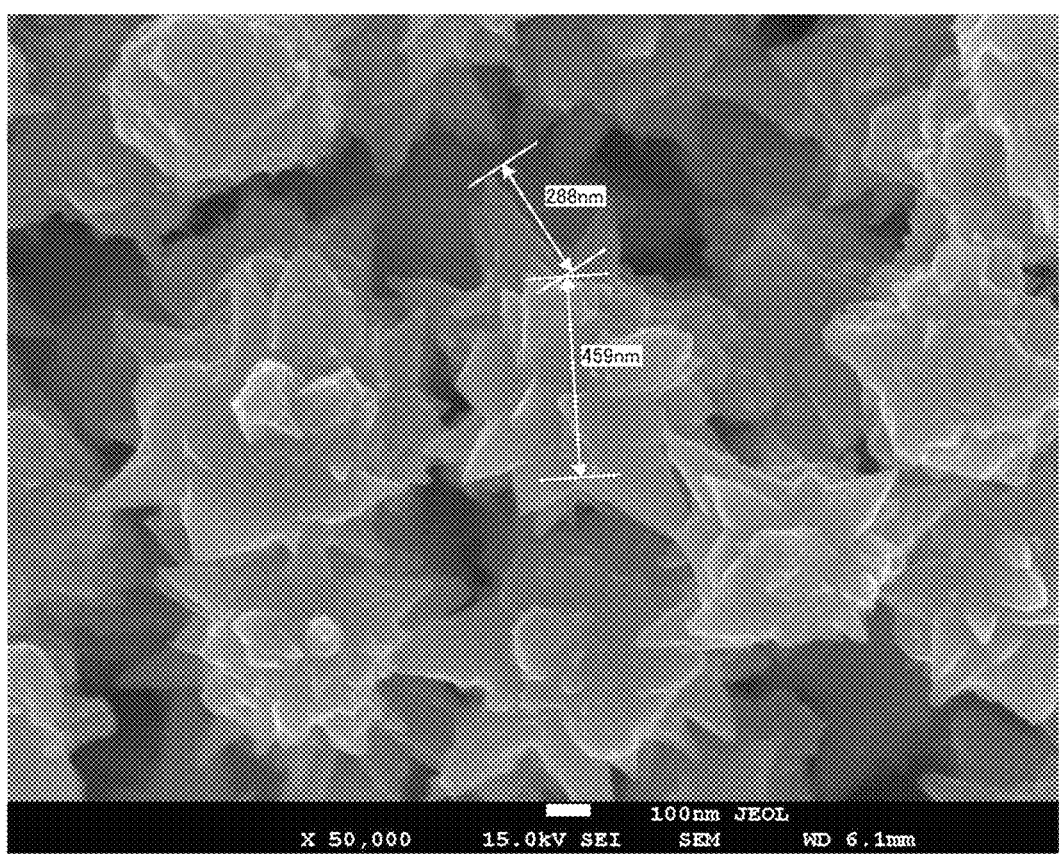
FIG. 8: This shows the SEM picture of the nickel microparticle obtained in Production Example 3 with the magnification of 50,000.
Figure 9:
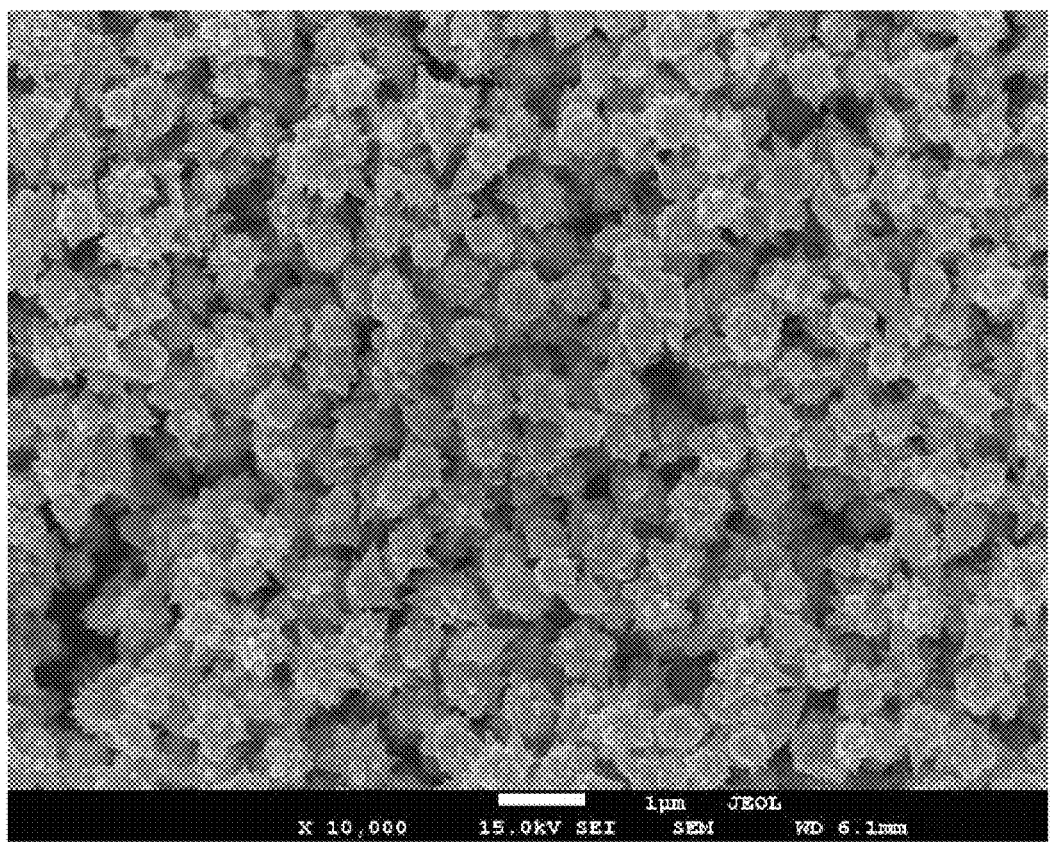
FIG. 9: This shows the SEM picture of the nickel microparticle obtained in Production Example 3 with the magnification of 10,000.
Figure 10:
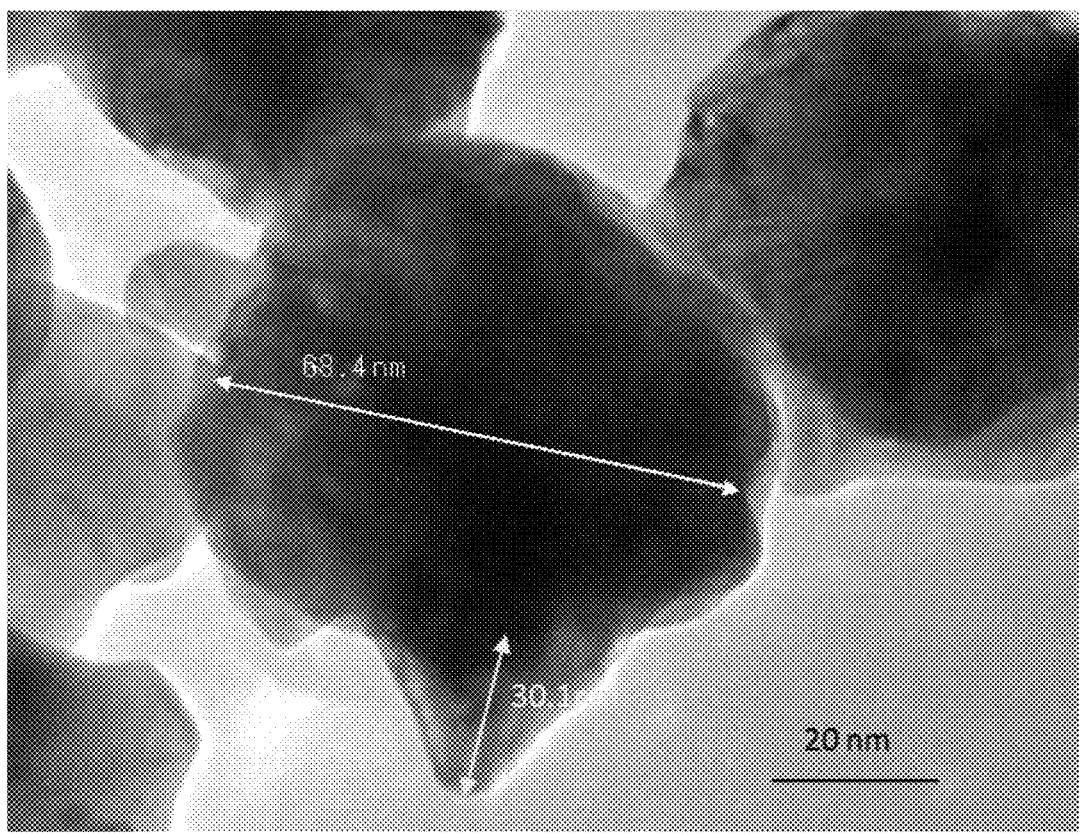
FIG. 10: This shows the TEM picture of the nickel microparticle obtained in Production Example 4.
Figure 11:
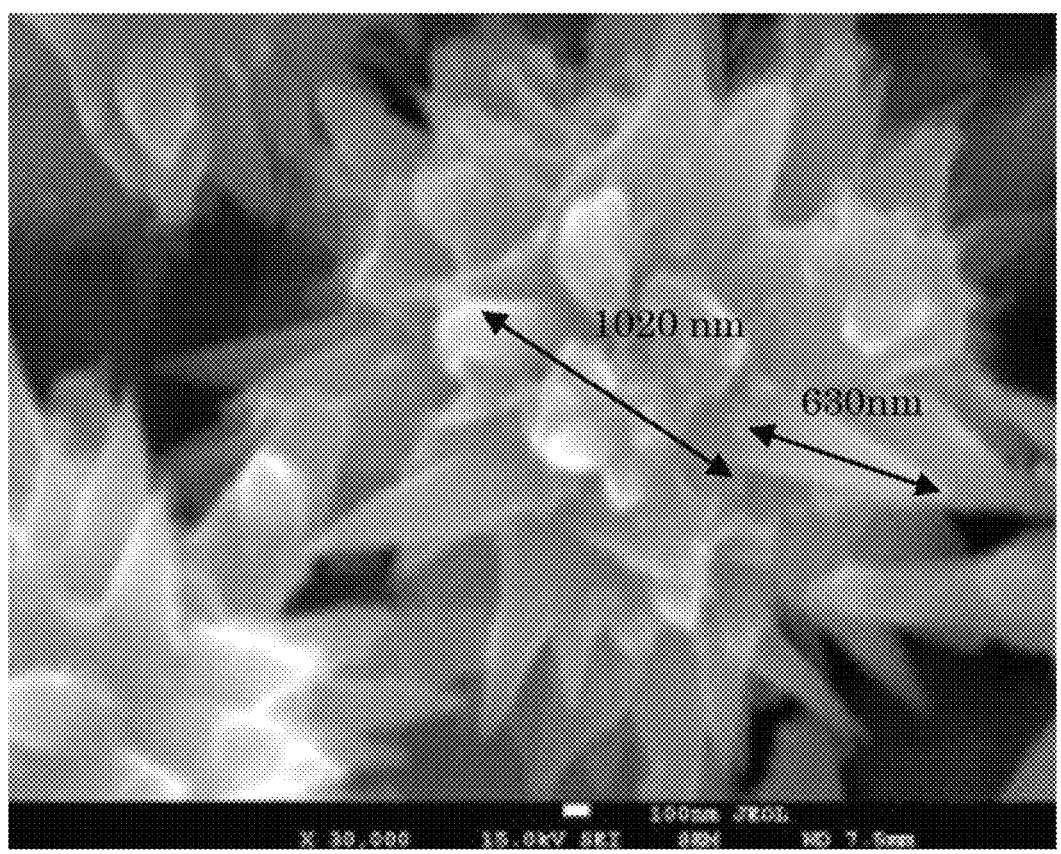
FIG. 11: This shows the SEM picture of the nickel microparticle obtained in Production Example 5 with the magnification of 30,000.
Figure 12:
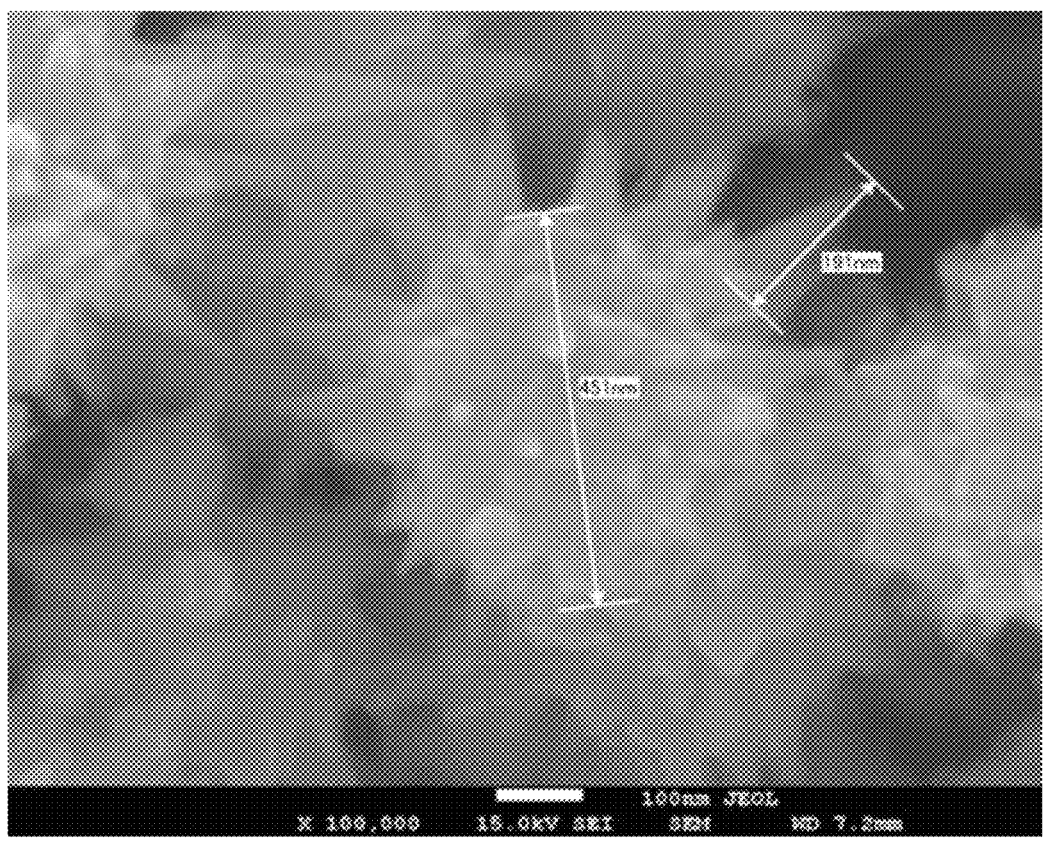
FIG. 12: This shows the SEM picture of the nickel microparticle obtained in Production Example 6 with the magnification of 100,000.
Figure 13:
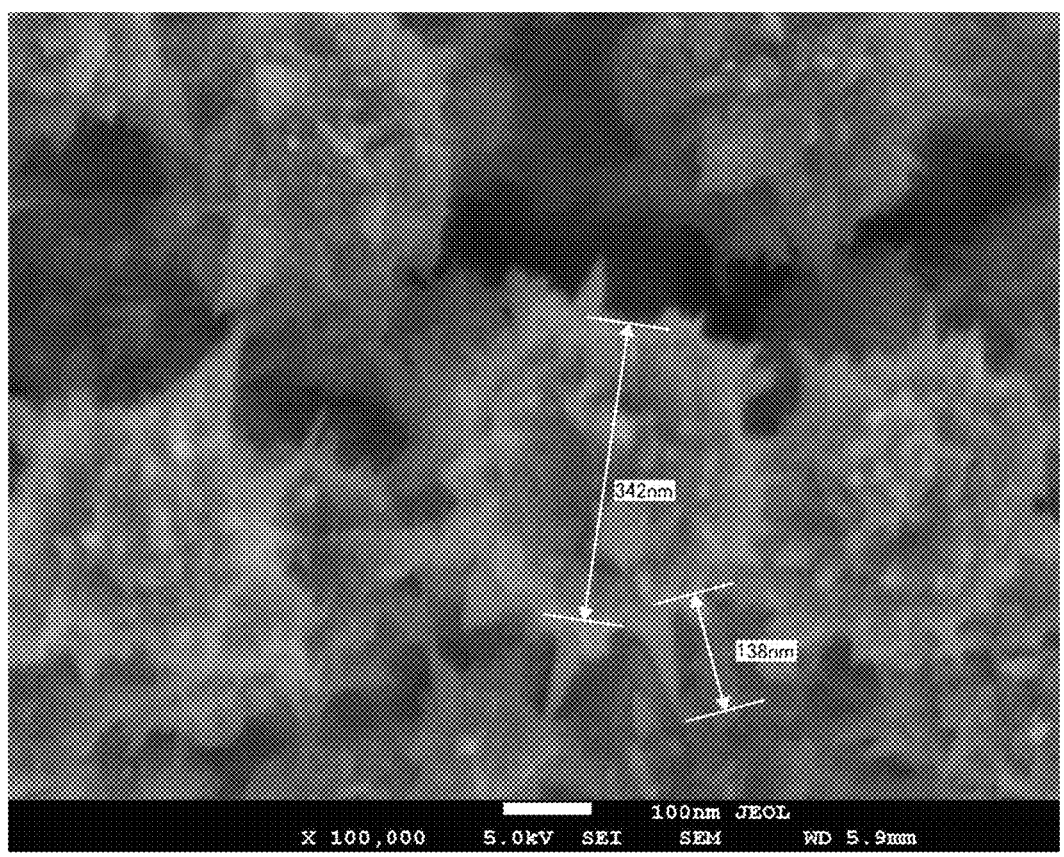
FIG. 13: This shows the SEM picture of the nickel microparticle obtained in Production Example 7 with the magnification of 100,000.
Figure 14:
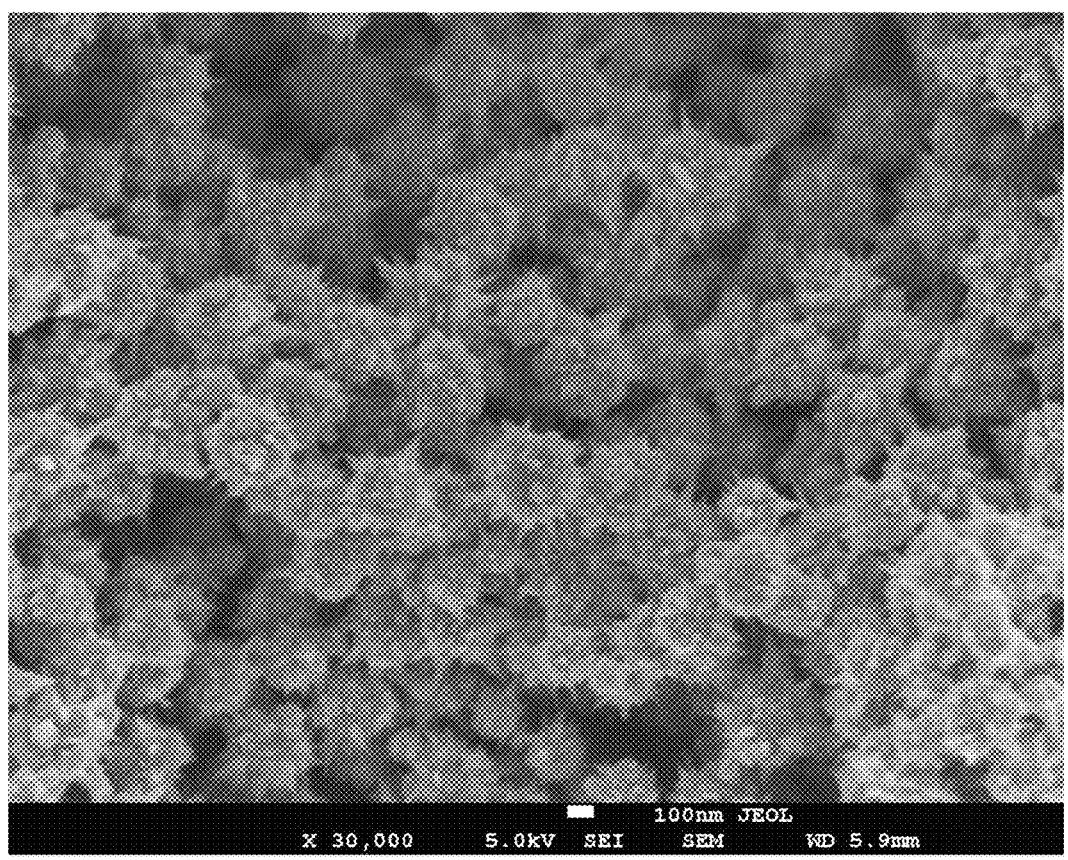
FIG. 14: This shows the SEM picture of the nickel microparticle obtained in Production Example 7 with the magnification of 30,000.
Figure 15:
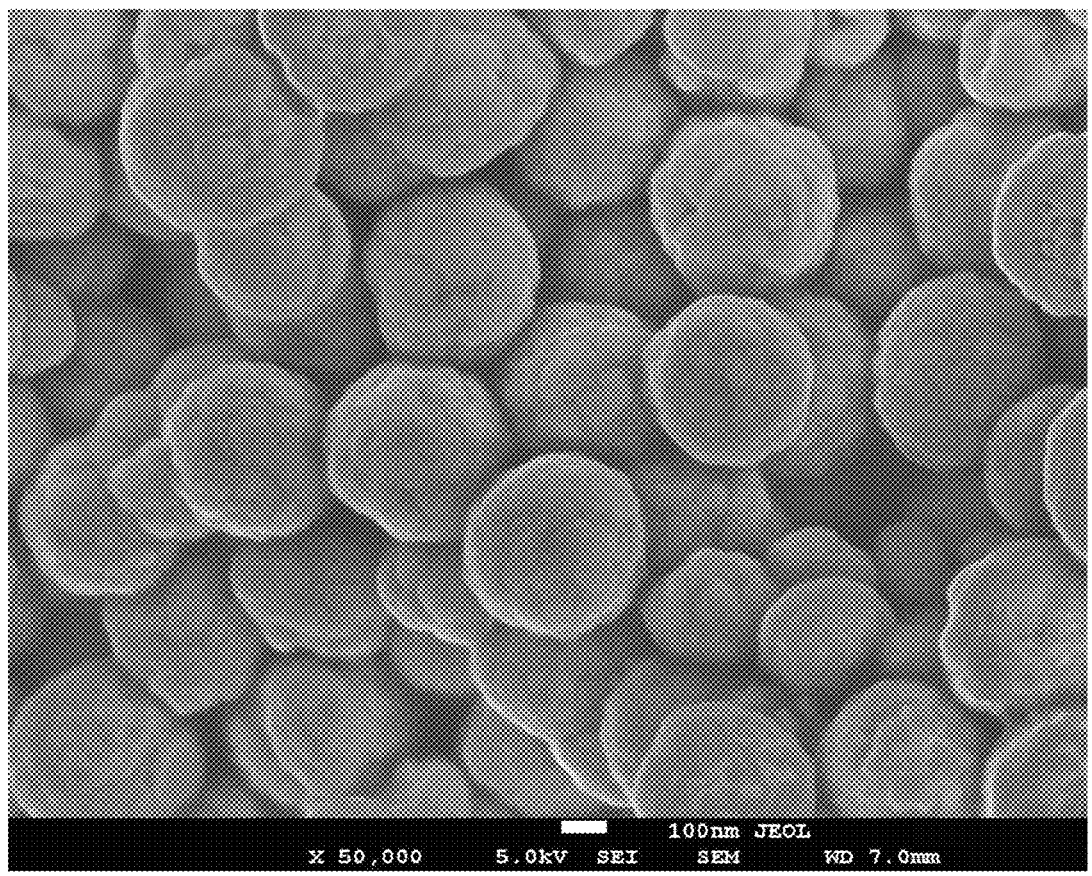
FIG. 15: This shows the SEM picture of the nickel microparticle obtained in Production Example 8 with the magnification of 50,000.
Figure 16:
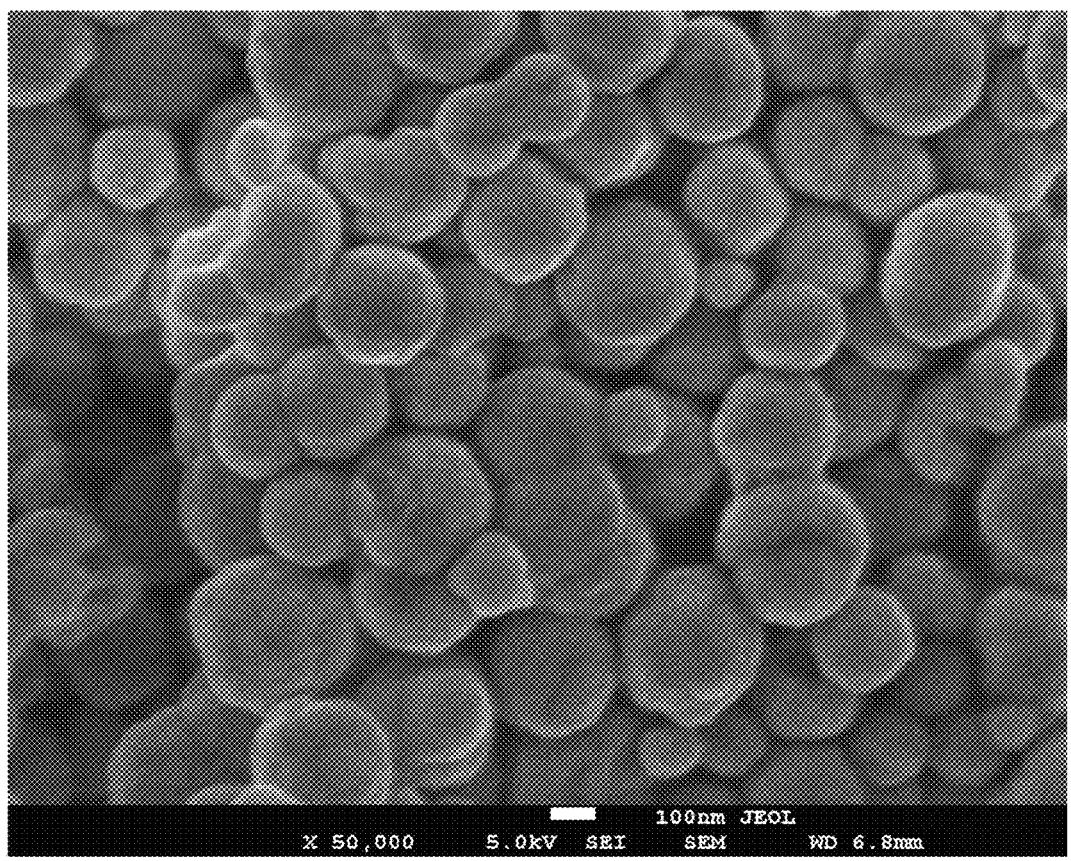
FIG. 16: This shows the SEM picture of the nickel microparticle obtained in Production Example 9 with the magnification of 50,000.

The fluid processing apparatus shown in FIG. 1 to FIG. 3, the same apparatus described in International Patent Laid-Open Publication No. WO 2009/008393, which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 μm to 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow. Shape of the opening part d20 may be circular as shown in FIG. 2(B) and FIG. 3(B), or a concentric circular ring shape which encloses the central opening of the processing surface 2 having a form of a ring-like disk, though not shown. In the case that the opening part is made in the circular ring shape, the opening part having the circular ring shape may be continuous or discontinuous.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle (θ2) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the above-mentioned apparatus, a treatment such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Production Example

With regard to the method for producing the metal microparticle of the present invention, nickel is taken as one example thereof. The used apparatus is shown in FIG. 1 to FIG. 3, which is based on the principle disclosed in International Patent Laid-Open Publication No. 2009/008393 as mentioned above; and the reaction apparatus which is sold by the applicant of the present invention was used (product name of ULREA SS-11, manufactured by M Technique Co., Ltd.). As the first fluid the nickel compound solution was used, and as the second fluid the reducing agent solution was used; and the first fluid and the second fluid were mixed by using this apparatus to separate out the nickel microparticle.

In this operation, in order to stably produce the nickel microparticle having the projection, it is preferable that pH of the fluid after mixing of the first fluid and the second fluid be made 14 or lower. More preferably, pH of the said fluid is made in the range of 10 to 14. Adjustment of pH may be done directly by pH in the first fluid or in the second fluid; or alternatively, the mixing ratio of the first fluid and the second fluid may be changed in such a way that pH after the mixing may fall in the foregoing range. By the above-mentioned procedure, the metal microparticle having the projection with the ratio d/D of the crystallite diameter (d) to the particle diameter (D) being 0.02 or more can be obtained.

Conditions including the first fluid and the second fluid used in Production Examples 1 to 7 and the shape of the opening part d20 (see FIG. 2(B)) of the second fluid are shown in Table 1 and Table 2. The average crystallite diameter d (nm), the average particle diameter D (nm), the ratio (d/D) of the average crystallite diameter d to the average particle diameter D, and the maximum projection height (%) relative to the average particle diameter of the nickel microparticles obtained in each of Production Examples are shown in Table 3. The measurement values of the particle diameter (nm) and the maximum projection height (nm) of the nickel microparticles obtained in each of Production Examples as well as the maximum projection heights (%) relative to the particle diameters based on these measured values are shown in Table 4; the measurement being based on the electron microscope observation.

As Examples 1 to 7, the electron microscopic pictures of the nickel microparticles obtained in Production Examples 1 to 7 are shown in FIG. 4 to FIG. 14; and as Comparative Examples 1 to 3, the electron microscopic pictures of the nickel microparticles obtained in Production Examples 8 to 10 are shown in FIG. 15 to FIG. 18.

(Observation by the Scanning Electron Microscope)

Figure 23:
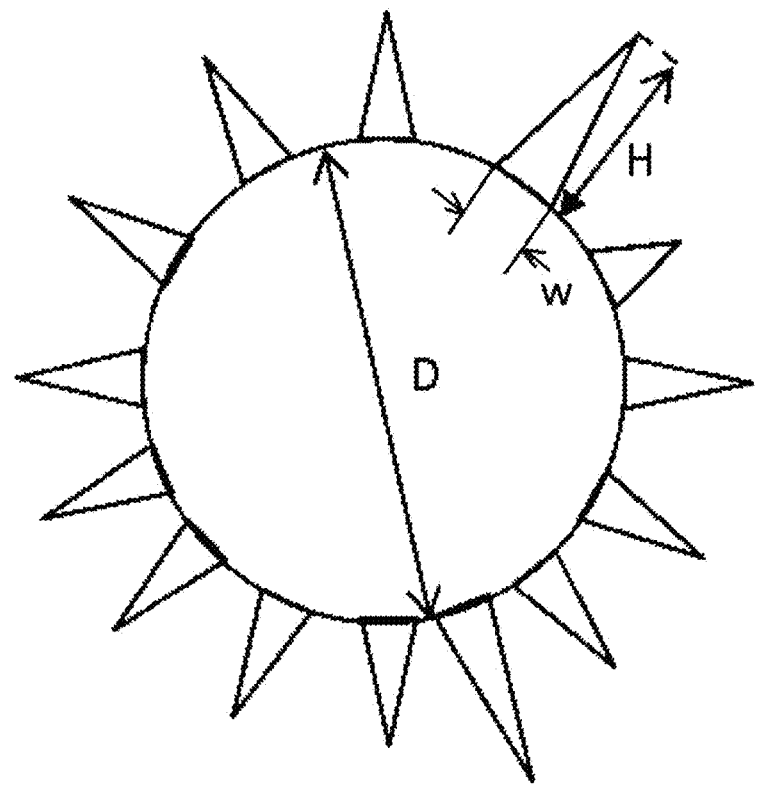
FIG. 23: (A) and (B) are the explanatory drawings of the metal microparticle of the present invention.
Figure 23:
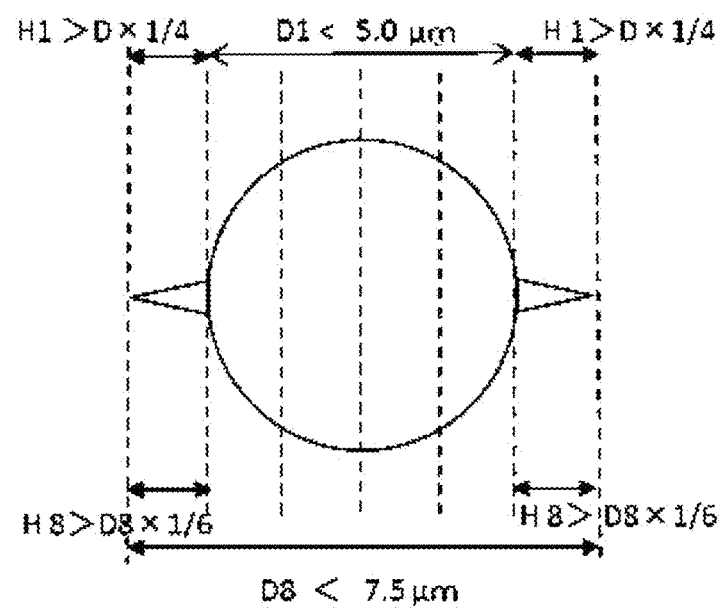

Observation by the scanning electron microscope (SEM) was done by using the field-emission-type scanning electron microscope (FE-SEM) (JSM-7500F, manufactured by JEOL Ltd.). The observation condition with the magnification of 10,000 or more was used; and in the case that the microparticle confirmed by the SEM observation was spherical, the diameter thereof was taken as the particle diameter, and in the case of a non-spherical shape such as an oval shape, the longest length thereof was taken as the particle diameter, so that these diameters were taken as the particle diameter (D). The particle diameter (D) and the projection height (H) are shown in FIG. 23. Meanwhile, the particle diameter is the average value of plural microparticles obtained by the SEM observation.

(Transmission Electron Microscope)

For the observation with the transmission electron microscope (TEM), the transmission electron microscope JEM-2100 (manufactured by JEOL Ltd.) was used. Observation condition with the magnification of 30,000 or more was used; and as to the particle diameter, the average value of the particle diameters of 100 primary particles was used. Hereunder, the diameter of the microparticles confirmed by the TEM observation was used also as the particle diameter. In a similar way to the SEM observation, in the TEM observation too, the particle diameter (D) and the projection height (H) were determined.

Measurement of the X-Ray Diffraction:

Measurement of the X-ray diffraction (XRD) was made by using the powder X-ray diffraction measurement instrument X'pert PRO MPD (XRD; manufactured by Panalytical Business Unit of Spectris Co., Ltd.). The measurement conditions were as follows: Cu anticathode, tube voltage of 45 kV, tube current of 40 mA, 0.016 step/10 second, and the measurement range of 10 to 100°/2θ (Cu). The crystallite's diameter of the obtained nickel microparticle was calculated from the XRD measurement. The peak confirmed at 47.3° C. was used for the polycrystalline silicon plate, and the Scherrer's equation was applied to the peak appeared near to 44.5° in the obtained nickel diffraction pattern.

(BET Specific Surface Area)

The BET specific surface area (S2) in Table 3 was measured by using the high-speed specific surface area/pore distribution measurement instrument NOVA 4200e (manufactured by Quantachrome Corp.). Pre-treatment of the sample was done with the temperature of 100° C. and the time of 1 hour; and the measurement time of 50 minutes was used.

The specific surface area (S1) in Table 3 was calculated by the following equation (1) by using the specific gravity ρ of nickel (8908 kg/m$^3$) and the average particle diameter D (nm) of the nickel microparticles obtained in each Example.

$$S1=3/(\rho \times (D/2) \times 10^{-9})/1000 \ (m^2/g) \qquad (1)$$

TABLE 1

| Production Example | First fluid Recipe | Second fluid Recipe | Shape of the opening part of the second fluid |
|---|---|---|---|
| 1 | 0.2M NiSO$_4$•6H$_2$O-0.015M PEG 600-26.8M H$_2$O-EG solution (pH = 3.47, 28.4° C.) | 12.1M HMH-4.31M KOH aqueous solution (pH 14<) | Circular ring |
| 2 | 0.45M HMH-0.13 wt % BYK 154-0.2M KOH-EG solution (pH = 13.13) | 1.0M Ni(NO$_3$)$_2$•6H$_2$O-0.1 wt % BYK 154 aqueous solution (pH = 3.56, 22.3° C.) | 3 holes |
| 3 | 0.2M NiSO$_4$•6H$_2$O-0.02M PEG 600-8.3M H$_2$O-0.05 H$_2$SO$_4$-EG solution (pH = 2.26, 32.5° C.) | 7.9M HMH-2.0M KOH aqueous solution (pH 14<) | Circular ring |
| 4 | 0.2M NiSO$_4$•6H$_2$O-0.02M PEG 600-8.3M H$_2$O-0.05 H$_2$SO$_4$-0.05M K$_2$SO$_4$_EG solution (pH = 2.16, 32.5° C.) | 16.8M HMH-2.1M KOH aqueous solution (pH 14<) | Circular ring |
| 5 | 0.3M NiSO$_4$•6H$_2$O-0.02M PEG 600-25.3M H$_2$O-EG solution (pH = 3.47, 28.4° C.) | 11.2M HMH-2.0M KOH aqueous solution (pH 14<) | Circular ring |
| 6 | 0.45M HMH-KOH-0.13 wt % BYK 154-EG solution (pH = 13.00, 28.8° C.) | 1.0M Ni(NO$_3$)$_2$•6H$_2$O aq.-0.1 wt % BYK 154 aqueous solution (pH = 3.68, 28.7° C.) | 3 holes |
| 7 | 0.45M HMH-KOH-0.1 wt % PAA-EG solution (pH = 13.20, 32.8° C.) | 1.0M Ni(NO$_3$)$_2$•6H$_2$O aq. (pH = 3.05, 27.8° C.) | 3 holes |
| 8 (Comparative Example 1) | 0.2M NiSO$_4$•6H$_2$O-0.03M PEG 600-8.3M H$_2$O-EG solution (pH = 4.38, 31.0° C.) | 16.8M HMH-2.1M KOH aqueous solution (pH 14<) | Circular ring |
| 9 (Comparative Example 2) | 0.2M NiSO$_4$•6H$_2$O-0.03M PEG 600-8.3M H$_2$O-EG solution (pH = 4.38, 31.0° C.) | 16.8M HMH-2.1M KOH aqueous solution (pH 14<) | Circular ring |
| 10 (Comparative Example 3) | 0.45M HMH-0.06M KOH-0.01 wt % PAA-EG solution (pH = 12.61, 25.4° C.) | 1.0M Ni(NO$_3$)$_2$•6H$_2$O aqueous solution (pH = 3.02, 25.8° C.) | Circular ring |

Abbreviations Used in Table:

HMH: hydrazine monohydrate, BYK 154 (dispersant BYK-154; manufactured by BYK-Chemie GmbH), KOH: potassium hydroxide, EG: ethylene glycol, PEG 600: polyethylene glycol 600, H$_2$O: water (pure water), H$_2$SO$_4$: sulfuric acid, NiSO$_4$.6H$_2$O: nickel sulfate hexahydrate, Ni(NO$_3$)$_2$.6H$_2$O: nickel nitrate hexahydrate, TEA: triethanol amine, and PAA: ammonium polyacrylate.

As to the shape of the opening part of the second fluid, "3 holes" means that 3 opening parts in the shape of a point are arranged in the same distance from the center of the second processing surface with the equal angle with each other among the opening parts; and "circular ring" means that the circular opening with a true ring is arranged.

TABLE 2

| | | First fluid | | Second fluid | |
|---|---|---|---|---|---|
| Production Example | Rotation number (rpm) | Flow rate (mL/minute) | Temperature (° C.) | Flow rate (mL/minute) | Temperature (° C.) |
| 1 | 1700 | 400 | 134 | 60 | 30 |
| 2 | 1700 | 400 | 114 | 10 | 21 |
| 3 | 3600 | 400 | 137 | 150 | 31 |
| 4 | 3600 | 400 | 139 | 75 | 25 |
| 5 | 1700 | 400 | 133 | 125 | 33 |
| 6 | 1700 | 400 | 110 | 10 | 25 |
| 7 | 1700 | 400 | 110 | 5 | 25 |

TABLE 2-continued

| | | First fluid | | Second fluid | |
|---|---|---|---|---|---|
| Production Example | Rotation number (rpm) | Flow rate (mL/minute) | Temperature (° C.) | Flow rate (mL/minute) | Temperature (° C.) |
| 8 (Comparative Example 1) | 3600 | 1000 | 150 | 75 | 30 |
| 9 (Comparative Example 2) | 3600 | 400 | 154 | 20 | 30 |
| 10 (Comparative Example 3) | 1000 | 400 | 105 | 15 | 23 |

TABLE 3

| Production Example | Discharged solution pH | Crystallite diameter d (nm) | Average particle diameter D (nm) | d/D | Maximum projection height H relative to average particle diameter (%) | Specific surface area S1 (g/m$^2$) As spherical shape | Specific surface area S2 (g/m$^2$) BET | S2/S1 |
|---|---|---|---|---|---|---|---|---|
| 1 | 11.15 | 23.87 | 285.3 | 0.084 | 111.2 | 2.36 | 10.11 | 4.28 |
| 2 | 11.13 | 31.5 | 384.6 | 0.082 | 66.7 | 1.75 | 20.26 | 11.57 |
| 3 | 13.45 | 54.12 | 481.2 | 0.112 | 72.1 | 1.40 | 8.12 | 5.80 |
| 4 | 10.15 | 19.15 | 72.1 | 0.266 | 33.4 | 9.34 | 32.10 | 3.44 |
| 5 | 13.00 | 36.4 | 1066.0 | 0.034 | 60.0 | 0.63 | 15.80 | 25.01 |
| 6 | 13.01 | 10.5 | 454.3 | 0.023 | 33.1 | 1.48 | 26.60 | 17.94 |
| 7 | 12.68 | 16.5 | 362.1 | 0.046 | 35.6 | 1.86 | 7.59 | 4.08 |
| 8 (Comparative Example 1) | 8.86 | 14.8 | 441.8 | 0.033 | 0.0 | 1.52 | 2.84 | 1.86 |
| 9 (Comparative Example 2) | 8.95 | 14.8 | 346.7 | 0.043 | 0.0 | 1.94 | 4.12 | 2.12 |
| 10 (Comparative Example 3) | 9.36 | 18.16 | 1014.6 | 0.018 | 10.4 | 0.66 | 0.92 | 1.39 |

TABLE 4

| Production Example | Particle diameter (nm) | Maximum projection height (nm) | Maximum projection height/particle diameter (%) |
|---|---|---|---|
| 1 | 207 | 230 | 111.11 |
| 2 | 384 | 232 | 60.42 |
| 3 | 459 | 288 | 62.75 |
| 4 | 68.4 | 30.1 | 44.01 |
| 5 | 1020 | 630 | 61.76 |
| 6 | 451 | 191 | 42.35 |
| 7 | 342 | 138 | 40.35 |
| 10 (Comparative Example 3) | 843.2 | 30.1 | 3.57 |

It was confirmed that all of the nickel microparticle obtained in Production Examples 1 to 7 have plural projections, and that at least one projection among them has the value larger than ¼ relative to the particle diameter of the nickel microparticle, and that the ratio (d/D) of the crystallite diameter (d) to the particle diameter (D) is 0.02 or more.

(Heat Treatment)

The nickel microparticles obtained in Production Example 7 and Production Example 9 (Comparative Example 2) were heat-treated; and these results are shown in FIG. 19 to FIG. 22.

Figure 19:
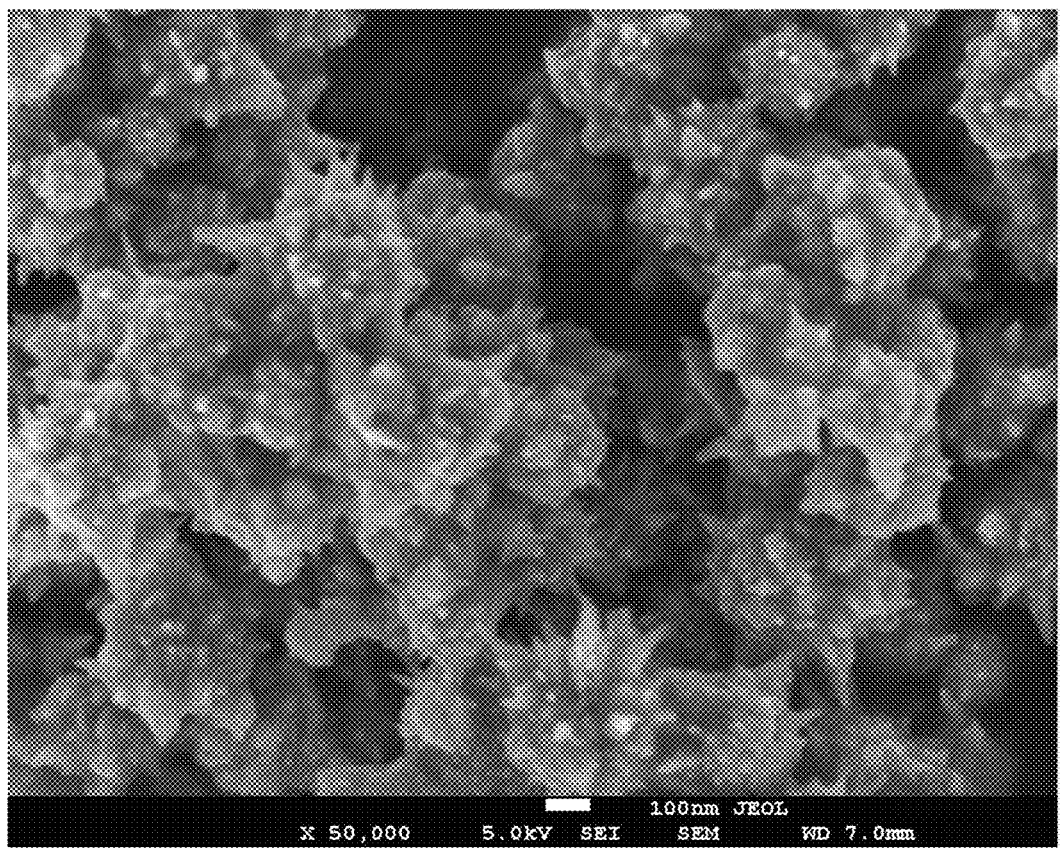
FIG. 19: This shows the SEM picture of the nickel microparticle with the magnification of 50,000 which was obtained in Production Example 7 followed by the heat treatment thereof at 150° C. for 3 hours.
Figure 20:
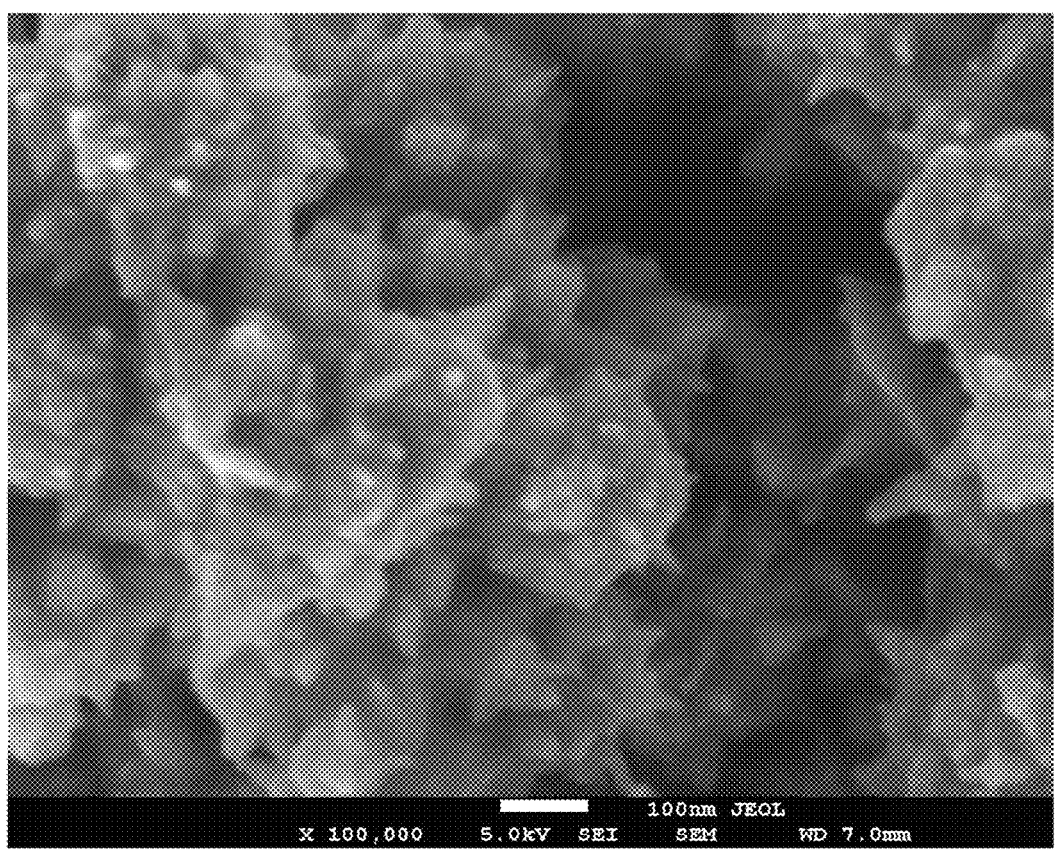
FIG. 20: This shows the SEM picture of the nickel microparticle with the magnification of 100,000 which was obtained in Production Example 7 followed by the heat treatment thereof at 150° C. for 3 hours.
Figure 21:
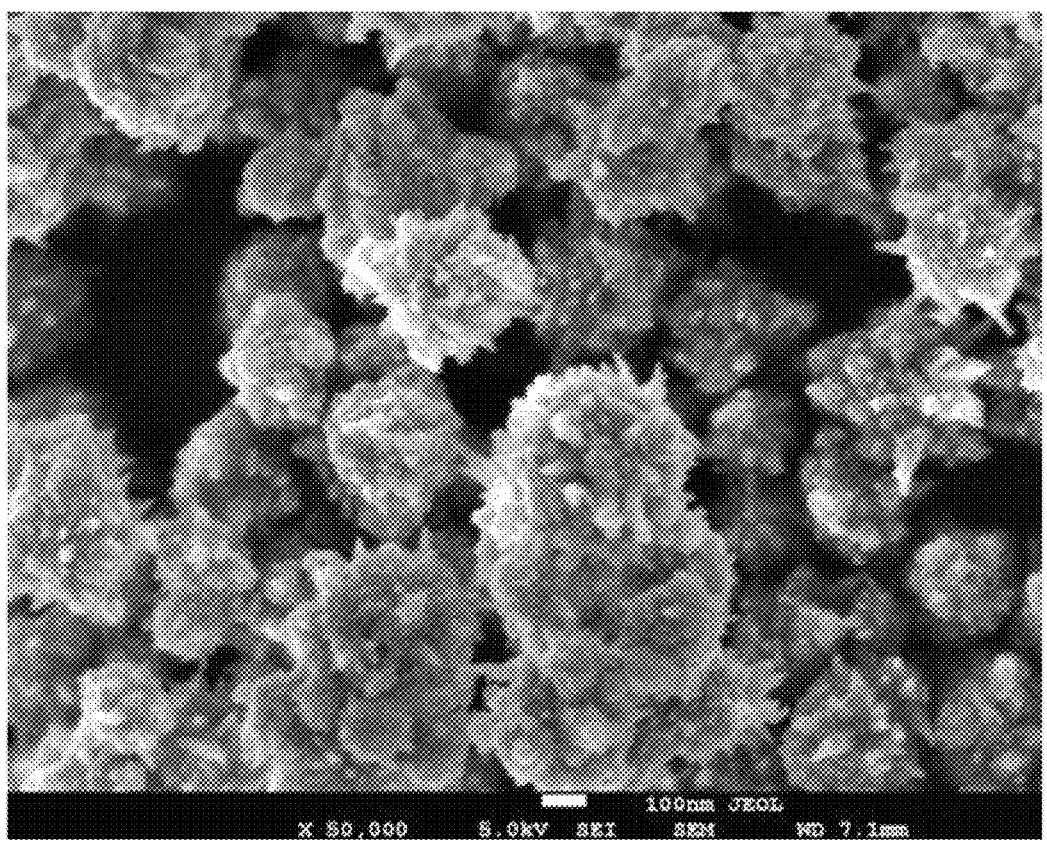
FIG. 21: This shows the SEM picture of the nickel microparticle with the magnification of 50,000 which was obtained in Production Example 7 followed by the heat treatment thereof at 250° C. for 3 hours.

FIG. 19 shows the SEM picture of the nickel microparticle with the magnification of 50,000 which was obtained in Production Example 7 followed by the heat treatment thereof at 150° C. for 3 hours; and FIG. 20 shows the SEM picture of the same with the magnification of 100,000. FIG. 21 shows the SEM picture of the nickel microparticle with the magnification of 50,000 which was obtained in Production Example 7 followed by the heat treatment thereof at 250° C. for 3 hours.

Figure 22:
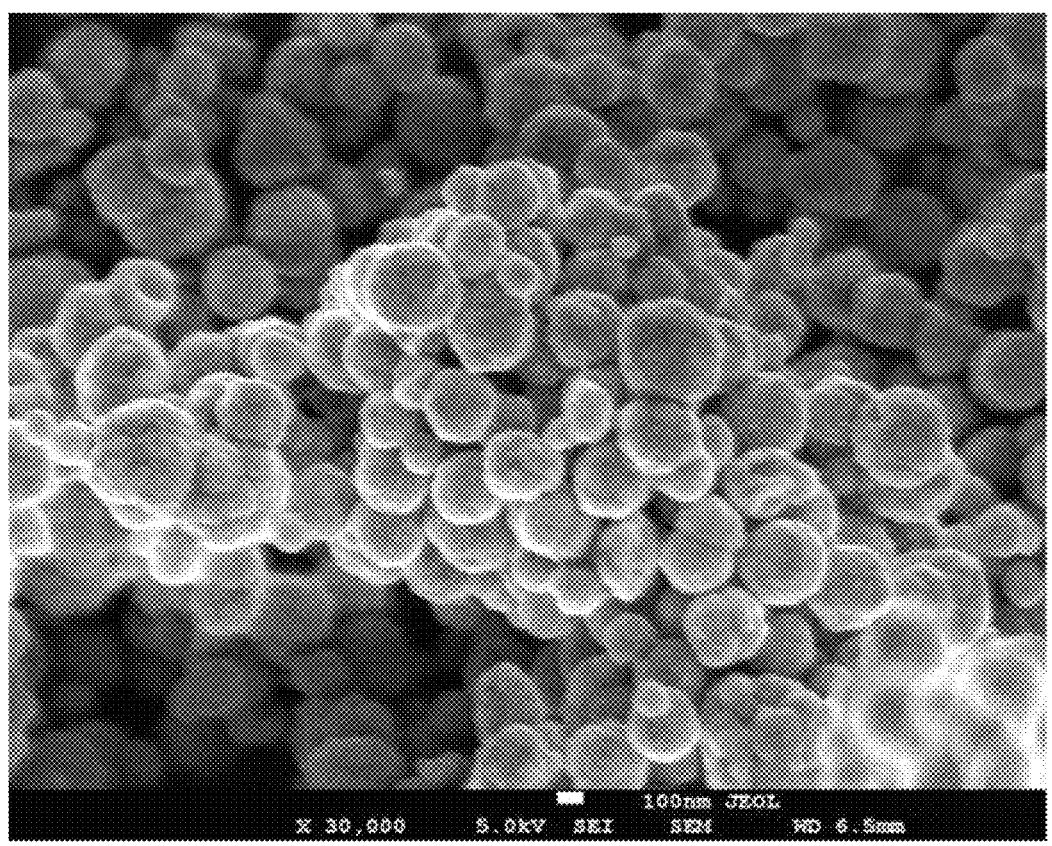
FIG. 22: This shows the SEM picture of the nickel microparticle with the magnification of 30,000 which was obtained in Production Example 9 followed by the heat treatment thereof at 150° C. for 3 hours.

On the other hand, FIG. 22 shows the SEM picture of the nickel microparticle with the magnification of 30,000 which was obtained in Production Example 9 (comparative Example 2) followed by the heat treatment thereof at 150° C. for 3 hours.

Both particles obtained in Production Example 7 and Production Example 9 are the almost identical particle with regard to the particle diameter, the crystallite diameter, and the ratio (d/D) of the crystallite diameter to the particle diameter. However, as can be seen in FIG. 19 and FIG. 20, the state was confirmed how the particles obtained in Production Example 7 were fused even when the heat treatment was done at 150° C. for 3 hours, the state similar to the case when the heat treatment was done at 250° C. for 3 hours. Furthermore, a big difference with regard to the degree of fusion among the particles was not confirmed between the case that heat treatment was done at 150° C. and the case that heat treatment was done at 250° C., as it is apparent by comparing between FIG. 19 and FIG. 21.

On the other hand, as can be seen in FIG. 22, the state was not confirmed that particles were clearly fused among themselves when the particles not having clear projections on surface thereof obtained in Production Example 9 (Comparative Example 9) were heat-treated at 150° C. for 3 hours. Moreover, though the drawing is omitted, when the particles obtained in Production Example 10 (Comparative Example 3) having short projections were heat-treated at 150° C. for 3 hours, too, the state was not confirmed that the front end of the projection was deformed or that the particles were clearly fused among themselves.

(Agglomeration)

Figure 17:
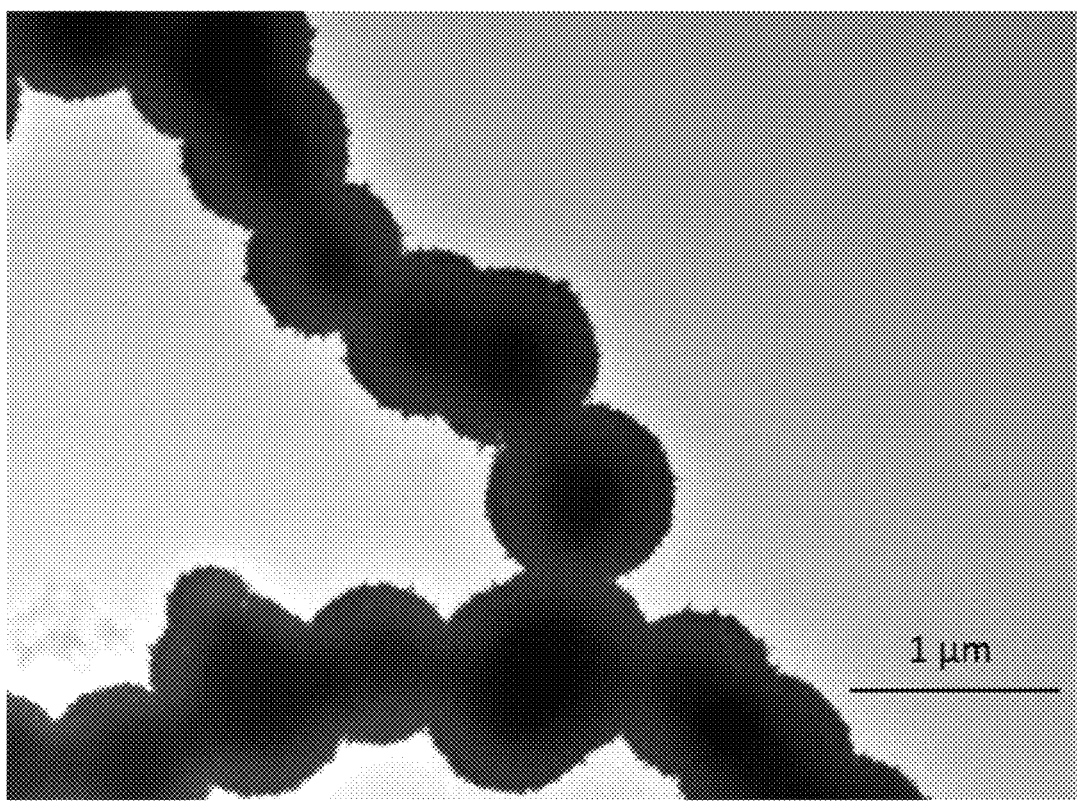
FIG. 17: This shows the TEM picture of the nickel microparticle obtained in Production Example 10.
Figure 18:
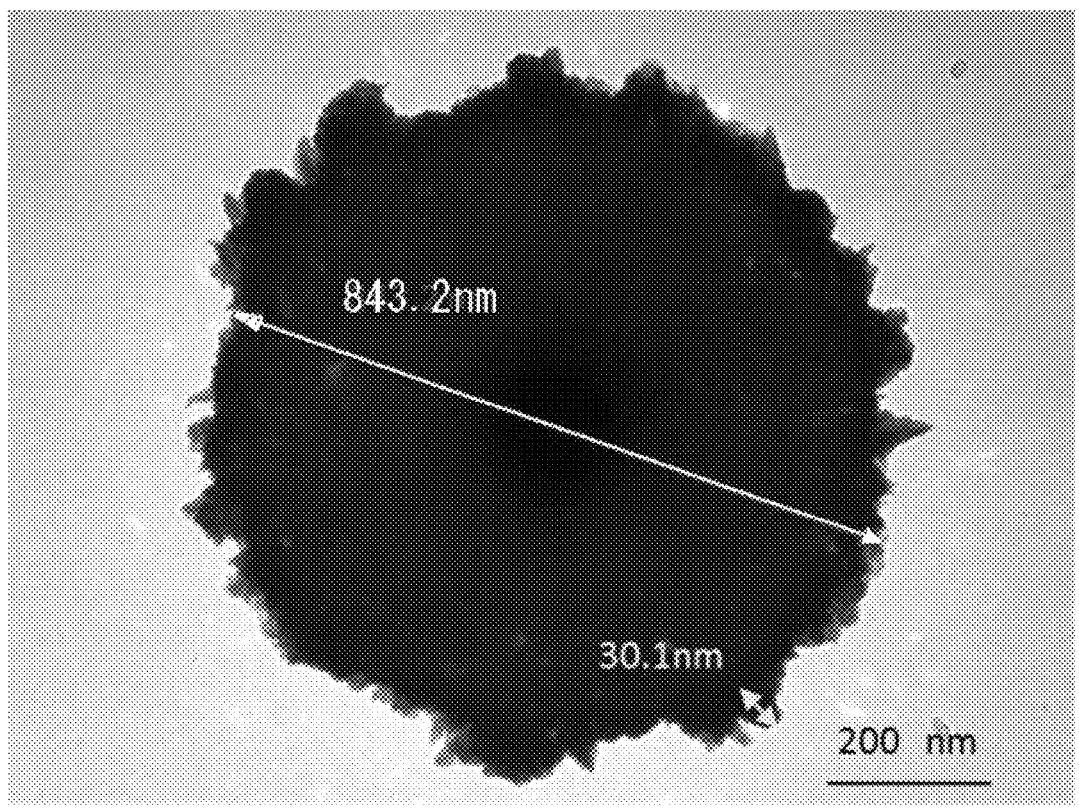
FIG. 18: This shows the TEM picture of the nickel microparticle obtained in Production Example 10, the picture being taken in the view field different from that of FIG. 17.

With regard to the particles obtained in Production Examples 1 to 7, for example, as shown in FIG. 5, FIG. 7, FIG. 9, and FIG. 10, agglomeration was not recognized in any of the particles thereof; on the other hand, with regard to the particles obtained in Production Example 8 (Comparative Example 1) to Production Example 10 (Comparative Example 3), for example, as shown in FIG. 17, agglomeration was recognized in all or part of the particles thereof.

INDUSTRIAL APPLICABILITY

According to the present invention, metal microparticle having conical projections with a height of at least one projection among the projections being more than ¼ of the particle diameter of the metal microparticle can be provided, so that prevention of poor conductivity as well as reduction of the resistance value can be expected; and in addition, possibilities of enhancement of the catalytic properties and of lowering of the heat treatment temperature to form wiring can be expected.

The invention claimed is:

1. A metal microparticle, which includes a nickel element contained therein and comprises a particle main body and a plurality of projections sticking out from the particle main body,
wherein a particle diameter of the particle main body is 5 µm or less,
wherein at least one projection of the plurality of projections tapers off to a point and has an apparent height by an electron microscope being in the range of more than 1/4 to less than 8/4 relative to the particle diameter of the particle main body, and
wherein a ratio (d/D) of a crystallite diameter (d) to a particle diameter (D) of the particle main body is 0.02 or more.

2. The metal microparticle according to claim 1, wherein the at least one projection has an apparent width thereof by an electron microscope that becomes gradually narrower from a base end to a front end thereof, and the apparent width of the base end is a value equal to or less than twice the apparent height.

3. The metal microparticle according to claim 1, wherein a specific surface area of the metal microparticle is 2.5 times or more relative to a converted value of a specific surface area calculated from the particle diameter of the particle main body with an assumption that the metal microparticle is spherical.

4. The metal microparticle according to claim 1, wherein the particle main body and the at least one projection are integrally formed from the same material.

5. The metal microparticle according to claim 1, wherein a number of the plurality of projections are large projections with an apparent height by an electron microscope being larger than 1/4 relative to the particle diameter of the particle main body, and the number of large projections is 30% or more relative to the total number of the projections.

6. A metal particle-containing composition, wherein the composition contains the metal microparticle according to claim 1, and the said composition is in the form of a powder or a slurry.

7. The metal microparticle according to claim 2, wherein a specific surface area of the metal microparticle is 2.5 times or more relative to a converted value of a specific surface area calculated from the particle diameter of the particle main body with an assumption that the metal microparticle is spherical.

8. The metal microparticle according to claim 2, wherein the particle main body and the at least one projection are integrally formed from the same material.

9. The metal microparticle according to claim 3, wherein the particle main body and the at least one projection are integrally formed from the same material.

10. The metal microparticle according to claim 5, wherein the particle main body and the at least one projection are integrally formed from the same material.

11. The metal microparticle according to claim 1, wherein a particle diameter of the particle main body is 1 µm or less.

12. The metal microparticle according to claim 1, wherein the apparent height by the electron microscope is in the range of more than 1/2 to less than 5/4 relative to the particle diameter of the particle main body.

13. A method of producing the metal microparticle according to claim 1, comprising the steps of:
introducing a nickel compound solution as a first fluid and a reducing agent solution as a second fluid into a processing device, the processing device comprising at least two processing surfaces facing each other, the at least two processing surfaces being operable to approach to and separate from each other, at least one of the at least two processing surfaces rotating relative to the other;
mixing the first and second fluids in a space formed between the at least two processing surfaces, thereby forming a thin film fluid between the at least two processing surfaces; and
separating nickel microparticle in the thin film fluid as the metal microparticle.

14. A method of producing a metal microparticle, comprising the steps of
introducing a nickel compound solution as a first fluid and a reducing agent solution as a second fluid into a processing device, the processing device comprising at least two processing surfaces facing each other, the at least two processing surfaces being operable to approach to and separate from each other, at least one of the at least two processing surfaces rotating relative to the other;
mixing the first and second fluids in a space formed between the at least two processing surfaces, thereby forming a thin film fluid between the at least two processing surfaces; and
separating nickel microparticle in the thin film fluid as the metal microparticle,
wherein the separated nickel microparticle includes a nickel element contained therein and comprises a particle main body and plural projections sticking out from the particle main body, and wherein at least one projection of the plural projections tapers to a point, and an apparent width of the at least one projection by an electron microscope becomes gradually narrower from a base end to a front end thereof, a longest apparent plain distance among the plural projections by the electron microscope is 7.5 µm or less, and an apparent height of the longest projection among the plural projections by the electron microscope is more than 1/6 relative to the longest apparent plain distance, the longest apparent plain distance being a longest distance between two front ends of two of the plural projections.

* * * * *